United States Patent [19]

Haas et al.

[11] 4,143,003

[45] Mar. 6, 1979

[54] POLYURETHANES MADE WITH LINEAR POLYAMINES

[75] Inventors: Peter Haas, Haan; Johannes Blahak, Cologne; Hans-Joachim Meiners; Werner Mormann, both of Leverkusen, all of Fed. Rep. of Germany

[73] Assignee: Bayer Aktiengesellschaft, Leverkusen, Fed. Rep. of Germany

[21] Appl. No.: 801,451

[22] Filed: May 27, 1977

[30] Foreign Application Priority Data

Jun. 1, 1976 [DE] Fed. Rep. of Germany ....... 2624527

[51] Int. Cl.² .............................................. C08L 9/00
[52] U.S. Cl. .................. 521/129; 260/583 P; 521/170; 528/53
[58] Field of Search ................. 260/2.5 AC, 77.5 AC, 260/583 P

[56] References Cited

U.S. PATENT DOCUMENTS

| 2,390,766 | 12/1945 | Zellhoefer et al. | 260/583 P |
| 2,762,744 | 9/1956 | Hazard et al. | 167/64 |
| 3,313,744 | 4/1967 | Rice | 260/2.5 |
| 3,742,057 | 6/1973 | Bunting et al. | 260/583 P |

OTHER PUBLICATIONS

Billo et al., *Kinetics of Ligand Exchange With Nickel (II) Triglycine*, JACS (93) (1971), pp. 2634–2641.

Primary Examiner—Lewis T. Jacobs
Attorney, Agent, or Firm—Gene Harsh; Joseph C. Gil; William E. Parry

[57] ABSTRACT

This invention relates to a process for the production of polyurethane resins (more particularly foam resins) in which linear polyamines containing at least four tertiary nitrogen atoms are used as catalysts. The compounds correspond to the general formula:

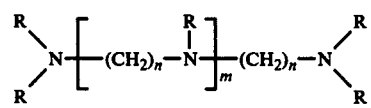

wherein the groups R, which may be the same or different, represent methyl or ethyl groups; m represents an integer of from 2 to 7; and the integers n, which may be the same or different, represent 2 or 3.

10 Claims, No Drawings

POLYURETHANES MADE WITH LINEAR POLYAMINES

BACKGROUND OF THE INVENTION

It is known that foam resins containing urethane groups may be produced by reacting compounds containing active hydrogen atoms with polyisocyanates in the presence of water, catalysts, stabilizers and, optionally, emulsifiers. The catalysts used are preferably tertiary amines.

In most cases, the differing extents to which the catalysts accelerate the reactions of the various components decisively determine the course of the reaction. The formation of a foam is a physico-chemical process in which several inter-connected reactions take place simultaneously. The individual processes result in the formation of the high molecular weight structure (urethane reaction) and in the evolution of carbon dioxide (blowing reaction) and must be finely adjusted. In theory, this may be optimally achieved by using catalysts which specifically catalyze either the urethane reaction or the blowing reaction. By proper catalyst selection, the respective reaction velocities may be proportionally adjusted. Alternately, it may be achieved by means of catalysts which simultaneously and congruently accelerate both reactions so that an optimum foam is obtained from a particular formulation. This means that high quality materials which have uniform properties, and a low specific gravity, (which is frequently desired), may be obtained under ideal operating conditions. The foams should have a faultless pore structure and they should not undergo any shrinkage. Shrinkage has a deleterious effect, particularly in the case of hard foams, which are used for insulating purposes or as supporting materials in composite constructions. Another important criterion is that the product should, as far as possible, be free from odors due to the catalysts.

The catalysts which are technically preferred for accelerating the blowing reaction are bis-(dialkylaminoalkyl)-ethers of the type described in U.S. Pats. Nos. 3,330,782, 2,941,967, and 3,694,510. The catalytic action of these compounds is apparently due to the combined presence of the ether oxygen atom and the tertiary nitrogen atom which are in the $\beta$- or $\delta$-position to each other.

DESCRIPTION OF THE INVENTION

A series of oxygen-free tertiary amines has now surprisingly been found which, in addition to having an extremely powerful accelerating effect on the blowing reaction, have a congruent and stepped catalytic effect on the cross-linking reaction so that it becomes unnecessary to add co-catalysts, such as tin(II) compounds and Dabco. It is thus possible to produce polyurethane foams which are both odorless and free from volatile substances.

The present invention relates to a process for the production of polyurethane resins, preferably by reaction of:
(a) polyisocyanates, with
(b) higher molecular weight compounds having at least two hydrogen atoms which are reactive with isocyanates, and, optionally,
(c) chain lengthening agents, in the presence of
(d) tertiary amines as catalysts, optionally with the addition of
(e) blowing agents, stabilizers and other known additives, wherein the substances used as component (d) are compounds corresponding to the following general formula:

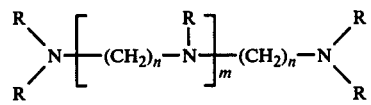

wherein the R groups, which may be the same or different, but are preferably the same, represent $C_1$-$C_5$ alkyl radicals, preferably $C_1$ or $C_2$ alkyl radicals and most preferably methyl groups;
m represents an integer of from 2 to 7, preferably from 2 to 4; and
the integers n, which may be the same or different, represent 2 or 3.

The present invention relates also to the preferred catalysts, wherein R represents a methyl or ethyl group and at least one n represents 3.

The catalysts used according to the present invention may be obtained, for example, by reacting known amines such as:

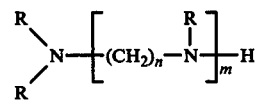

(see Houben-Weyl, Volume XI/1, page 256–259)
or

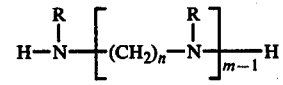

(see Beilstein, Volume 4 H, page 225)
with one or two mols of acrylonitrile to form the corresponding cyanoethyl derivatives which are then reduced to amines by known methods and are subsequently methylated by the Leuckart-Wallach reaction. The Leuckart-Wallach reaction is described e.g. in Houben-Weyl, Volume XI/1 (1957), pages 648–664 or by M.L. Moore in Organic Reactions 5 (1949), pages 301–330.

Another method of synthesis involves reacting amines corresponding to one of the above general formulae with halogenated alkylamines corresponding to the following general formula:

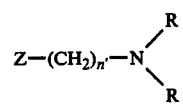

wherein Z represents a halogen atom, preferably chlorine, and n' (independently of n) represents 2 or 3; the reaction being carried out under pressure at an elevated temperature. (see Houben-Weyl, Volume XI/1, pages 124–133). Another possible method of preparation involves reacting difunctional halogenated alkylamines corresponding to the following general formula:

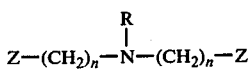

with secondary amines corresponding to the following general formula:

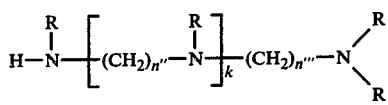

wherein k represents 0, 1 or 2; and n″ and n‴, which may be the same or different, each represents 2 or 3;

Z and R are as defined above, and the reaction being carried out under pressure at an elevated temperature.

Although it is known to use tertiary amines, such as triethylamine or permethylated diethylenetriamine, as catalysts for isocyanate polyaddition reactions, the catalytic activity of these compounds is relatively unsatisfactory.

In contrast, the catalysts used according to the present invention, are distinguished by their surprisingly powerful accelerating action on the blowing reaction of the foaming process and by the fact that foams produced with the aid of these catalysts are relatively odorless and have a surprisingly high resistance to hydrolysis. The compounds used according to the present invention contain no active hydrogen atoms and are therefore not incorporated into the polyurethane molecule by way of main valency bonds and hence remain active during the entire foaming process.

The following are examples of typical catalysts used according to the present invention:

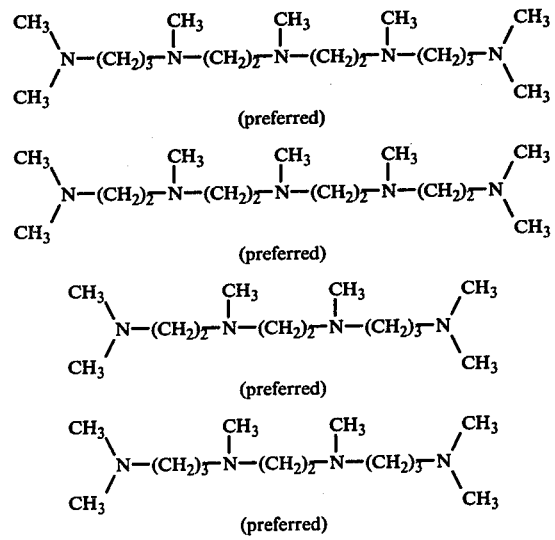

The catalysts are generally used in quantities of from 0.01 to 5%, by weight, preferably from 0.1 to 1%, by weight, based on the reaction mixture consisting of polyisocyanates, compounds which are reactive with isocyanates and optionally blowing agents and/or other additives.

The polyisocyanates used as starting components according to the present invention may be aliphatic, cycloaliphatic, araliphatic, aromatic or heterocylic polyisocyanates, such as those described, for example, by W. Siefken in Justus Liebigs Annalen der Chemie, 562, pages 75 to 136. These include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (DAS 1,202,785, U.S. Pat. No. 3,401,190); hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4′-diisocyanate and/or 4,4′-diisocyanate; phenylene-1,3-diisocyanate and -1,4-diisocyanate; tolylene-2,4-diisocyanate and -2,6-diisocyanate and mixtures of these isomers; diphenylmethane-2,4′-diisocyanate and/or 4,4′-diisocyanate; naphthylene-1,5-diisocyanate; triphenylmethane-4,4′,4″-triisocyanate; polyphenyl-polymethylene polyisocyanates which may be obtained by aniline-formaldehyde condensation followed by phosgenation and which have been described, for example, in British Patents 874,430 and 848,671; m- and p-isocyanatophenyl-sulphonyl isocyanates according to U.S. Pat. No. 3,454,606; perchlorinated aryl polyisocyanates, such as those described, for example, in German Auslegeschrift No. 1,157,601 (U.S. Pat. No. 3,277,138); polyisocyanates having carbodiimide groups as described in German Pat. No. 1,092,007 (U.S. Pat. No. 3,152,162); diisocyanates of the type described in U.S. Pat. No. 3,492,330; polyisocyanates containing allophanate groups as described e.g. in British Pat. No. 994,890 in Belgian Pat. No. 761,626 and in published Dutch Patent Application No. 7,102,524; polyisocyanates containing isocyanurate groups, e.g. as described in U.S. Pat. No. 3,001,973, in German Pats. Nos. 1,022,789; 1,222,067 and 1,027,394 and in German Offenlegungsschriften Nos. 1,929,034 and 2,004,048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described e.g. in German Pat. No. 1,101,394 (U.S. Pats. Nos. 3,124,605 and 3,201,372) and in British Pat. No. 889,050; polyisocyanates prepared by telomerization reactions as described for example, in U.S. Pat. No. 3,654,106; polyisocyanates having ester groups, such as those mentioned, for example, in British Pats. Nos. 965,474 and 1,072,956, and in German Pat. No. 1,231,688; reaction products of the above-mentioned isocyanates with acetals according to German Pat. No. 1,072,385; and polyisocyanates containing polymeric fatty acid groups according to U.S. Pat. No. 3,455,883.

The distillation residues, obtained from the commercial production of isocyanates, which still contain isocyanate groups, may also be used. They may be optionally used as solutions in one or more of the above-mentioned polyisocyanates. Mixtures of the above-mentioned polyisocyanates may also be used.

As a general rule, it is particularly preferred to use commercially readily available polyisocyanates, such as tolylene-2,4-diisocyanate and -2,6-diisocyanate and mixtures of these isomers ("TDI"); polyphenyl-polymethylene polyisocyanates of the type which may be prepared by aniline-formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The starting active hydrogen containing components used according to the present invention include compounds, generally having a molecular weight of from 400 to 10,000, which have at least two hydrogen atoms capable of reacting with isocyanates. These compounds may contain amino groups, thiol groups or carboxyl groups, but are preferably polyhydroxyl compounds, in particular compounds having from 2 to 8 hydroxyl groups and especially those having a molecular weight of from 800 to 10,000, preferably 1000 to 6000. These include polyesters, polyethers, polythioethers, polyacetals, polycarbonates and polyester amides having at least 2, generally from 2 to 8, and preferably from 2 to 4 hydroxyl groups, of the type known for the production of both homogeneous and cellular polyurethanes.

Suitable polyesters containing hydroxyl groups include, e.g. reaction products of polyhydric, preferably dihydric alcohols, optionally with the addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or may be unsaturated.

The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; fumaric acid; dimeric and trimeric fatty acids, such as oleic acid, optionally mixed with monomeric fatty acids, dimethyl terephthalate and terephthalic acid-bis-glycol esters. The following are examples of suitable polyhydric alcohols: ethylene glycol; propylene glycol-(1,2) and -(1,3); butylene glycol-(1,4) and -(2,3); hexane diol-(1,6); octane diol-(1,8); neopentyl glycol; cyclohexane dimethanol (1,4-bis-hydroxymethylcyclohexane); 2-methyl-1,3-propane diol; glycerol; trimethylolpropane; hexane triol-(1,2,6); butane triol-(1,2,4); trimethylol ethane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol; and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polyethers which may be used according to the present invention which have at least 2, generally from 2 to 8 and preferably 2 or 3 hydroxyl groups. Such compounds are known and may be prepared, for example, by polymerization of epoxides, such as ethylene oxide, propylene oxide, butylene oxide, tetrahydrofuran, styrene oxide or epichlorohydrin, either each on its own, e.g. in the presence of $BF_3$, or by addition of these epoxides, optionally as mixtures or successively, to starting components having reactive hydrogen atoms. The starting compounds include water, alcohols, ammonia or amines, e.g. ethylene glycol, propylene glycol-(1,3) or -(1,2), trimethylol propane, 4,4'-dihydroxydiphenylpropane, aniline, ethanolamine or ethylene diamine. Sucrose polyethers may also be used according to the present invention, e.g. those described in German Auslegeschriften Nos. 1,176,358 and 1,064,938. It is, in many cases, preferred to use polyethers which contain predominantly primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pats. Nos. 3,385,351; 3,304,273; 3,523,093 and 3,110,695 and German Pat. No. 1,152,536) as well as polybutadienes which have OH groups are also suitable.

Among the polythioethers which should be particularly mentioned are the condensation products obtained by reacting thiodiglycol on its own and/or with other glycols, dicarboxylic acids, formaldehyde, aminocarboxylic acids or amino alcohols. The products obtained thereby are polythio mixed ethers, polythio ether esters or polythio ether ester amides, depending on the co-components.

Suitable polyacetals include, for example, the compounds which may be prepared by reaction of glycols, such as diethylene glycol, triethylene glycol, 4,4'-dioxethoxy-diphenyl dimethylmethane and hexane diol, with formaldehyde. Suitable polyacetals for the purposes of the present invention may also be prepared by the polymerization of cyclic acetals.

The polycarbonates containing hydroxyl groups which may be used may be of known type, for example, those which may be prepared by the reaction of diols, such as propane diol-(1,3), butane diol-(1,4) and/or hexane diol-(1,6), diethylene glycol, triethylene glycol or tetraethylene glycol, with diaryl carbonates, e.g. diphenylcarbonate, or with phosgene.

Suitable polyester amides and polyamides include, for example, the predominantly linear condensates prepared from polybasic saturated and unsaturated carboxylic acids or the anhydrides thereof with polyvalent saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxide and phenol-formaldehyde resins or of alkylene oxides and urea-formaldehyde resins are also suitable for the purposes of the present invention.

Examples of the above-mentioned compounds have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45 to 71.

Mixtures of the above-mentioned compounds which contain at least two hydrogen atoms capable of reacting with isocyanates and have a molecular weight of from 400 to 10,000 may, of course, also be used, e.g. mixtures of polyethers and polyesters.

The starting components which may be used according to the present invention as chain lengthening or cross-linking agents include compounds having a molecular weight of from 32 to 400 which have at least two hydrogen atoms capable of reacting with isocyanates. These compounds are known and include compounds containing hydroxyl groups and/or amino groups and/or thiol groups and/or carboxyl groups, preferably hydroxyl groups and/or amino groups. They generally have from 2 to 8, preferably 2 or 3, hydrogen atoms capable of reacting with isocyanates.

The following are examples of such compounds: ethylene glycol; propylene glycol-(1,2) and -(1,3); butylene glycol-(1,4) and -(2,3); pentane diol-(1,5); hexane diol-(1,6); octane diol-(1,8); neopentyl glycol; 1,4-bis-hydroxymethyl-cyclohexane; 2-methyl-1,3-propane diol; glycerol; trimethylol propane; hexane triol-(1,2,6); trimethylolethane; pentaerythritol; quinitol; mannitol and sorbitol, diethylene glycol; triethylene glycol, tetraethylene glycol; polyethylene glycols having a molecular weight of up to 400; dipropylene glycol; polypropylene glycols having a molecular weight of up to 400; dibutylene glycol; polybutylene glycols having a molecular weight of up to 400; 4,4'-dihydroxy-diphenyl propane; dihydroxymethyl-hydroquinone; ethanolamine; diethanolamine; triethanolamine; 3-aminopropanol; ethylene diamine; 1,3-diaminopropane; 1-mercapto-3-aminopropane; 4-hydroxyphthalic acid; 4-aminophthalic acid; succinic acid; adipic acid; hydrazine; N,N-dimethylhydrazine; 4,4'-diaminodiphenylmethane; tolylene diamine; methylene-bis-chloroaniline; methylene-bis-anthranilic acid ester; diaminobenzoic acid ester; and the isomeric chlorophenylene diamines. Again, mixtures of these various compounds may be used.

According to the present invention, however, there may also be used polyhydroxyl compounds which contain high molecular weight polyadducts or polycondensates in a finely dispersed or dissolved form. These modified polyhydroxyl compounds may be obtained by carrying out polyaddition reactions (e.g. between polyisocyanates and amino functional compounds) or polycondensation reactions (e.g. between formaldehyde and phenols and/or amines) in situ in the above-mentioned hydroxyl compounds. Processes of this type have been described, for example, in German Auslegeschriften Nos. 1,168,075 and 1,260,142, in German Offenlegungsschriften Nos. 2,324,134; 2,423,984; 2,512,385; 2,513,815; 2,550,796; 2,550,797; 2,550,833 and 2,550,862. Alternatively, a completely prepared aqueous polymer dispersion may be mixed with a polyhydroxyl compound and the water may then be removed from the mixture, as described in U.S. Pat. 3,869,413 and in German offenlegungsschrift No. 2,550,860.

In many cases, when modified polyhydroxyl compounds of the type described above are used as starting components in the polyisocyanate polyaddition process, polyurethane resins having substantially improved mechanical properties are obtained.

According to the present invention, water and/or readily volatile organic substances may be used as blowing agents. Suitable organic blowing agents include, for example, acetone; ethyl acetate; halogen-substituted alkanes, such as methylene chloride, chloroform, ethylidene-chloride, vinylidene chloride, monofluorotrichloromethane, chlorodifluoromethane and dichlorodifluoromethane; butane; hexane; heptane; and diethyl ether. The blowing effect may also be obtained by the addition of compounds which decompose at temperatures above room temperature to release gases, such as nitrogen, e.g. azo compounds, such as azoisobutyric acid nitrile. Further examples of blowing agents and the use of blowing agents has been described in Kunststoff-Handbuch, Volume VII, published by Vieweg and Höchtlen, Carl-Hanser-Verlag, Munich 1966, e.g. on pages 108 and 109, 453 to 455.

As mentioned above, known activators may, but need not necessarily, be used according to the present invention in addition to the linear polyamines containing at least four tertiary nitrogen atoms described above. Suitable additional catalysts of this type include the conventional tertiary amines and silaamines which contain carbon-silicon bonds, for example the compounds described in German Pat. No. 1,229,290 (corresponding to U.S. Pat. No. 3,620,984), e.g. 2,2,4-trimethyl-2-silamorpholine and 1,3-diethylaminomethyltetramethyl-disiloxane. Other suitable catalysts include basic nitrogen compounds, such as tetraalkyl ammonium hydroxides; alkali metal hydroxides, such as sodium hydroxide; alkali metal phenolates, such as sodium phenolate; alkali metal alcoholates, such as sodium methylate; and hexahydrotriazines.

Organic metal compounds may also be used as catalysts in particular organic tin compounds. The organic tin compounds used are preferably tin (II-salts of carboxylic acids, such as tin(II) acetate, tin(II) octoate, tin(II) ethylhexoate and tin(II) (II) and tin(IV) compounds, such as dibutyl tin oxide, dibutyl tin dichloride, dibutyl tin diacetate, dibutyl tin dilaurate, dibutyl tin maleate or dioctyl tin diacetate.

Surface active additives, such as emulsifiers and foam stabilizers may also be used according to the present invention. Suitable emulsifiers include the sodium salts of ricinoleic sulphonate, or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

Particularly suitable foam stabilizers are polyether siloxanes, especially those which are water-soluble. These compounds generally have a polydimethylsiloxane group attached to a copolymer of ethylene oxide and propylene oxide. Foam stabilizers of this type have been described, for example, in U.S. Pats. Nos. 2,834,748; 2,917,480 and 3,629,308.

Other additives which may also be used according to the present invention include reaction retarders, e.g. substances which are acid in reaction, such as hydrochloric acid or organic acid halides; known cell regulators, such as paraffins or fatty alcohols or dimethyl polysiloxanes; pigments; dyes; known flame retarding agents such as tris-chloroethylphosphate, tricresyl phosphate or ammonium phosphate and polyphosphate; stabilizers against ageing and weathering; plasticizers; fungistatic and bacteriostatic substances; and fillers, such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning the use and mode of action of these additives may be found in Kunststoff-Handbuch, Volume VII, published by Vieweg and Hochtlen, Carl-Hanser-Verlag, Munich 1966, e.g. on pages 103 to 113.

According to the present invention, the components may be reacted together by the known one-shot process, by the prepolymer process or by the semi-prepolymer process, often using mechanical devices, such as those described in U.S. Pat. No. 2,764,565. Details concerning processing apparatus which may also be used according to the present invention may be found in Kunststoff-Handbuch, Volume VII, published by Vieweg and Hochtlen, Carl-Hanser-Verlag, Munich 1966, e.g. on pages 121 to 205.

According to the present invention, the foaming reaction for producing foam products is often carried out inside molds. In this process, the foamable reaction mixture is introduced into a mold which may be made of a metal, such as aluminium, or of a plastics material, such as an epoxide resin, and it foams inside the mold to produce the shaped product. This process of foaming in molds may be carried out to produce a product having a cellular structure at its surface or it may be carried out to produce a product having a compact skin and a cellular core. According to the present invention, the desired result may be obtained either by introducing just sufficient foamable reaction mixture to fill the mold with foam after the reaction or by introducing a larger quantity of reaction mixture than is necessary to fill the mold with foam. The second method is known as "overcharging", a procedure which has been disclosed, e.g. in U.S. Pats. Nos. 3,178,490 and 3,182,184.

Known so-called "external mold release agents", such as silicone oils, are frequently used when foaming is carried out inside molds. The process may also be carried out with the aid of so-called "internal mold release agents", if desired as mixtures with external mold release agents, e.g. as disclosed in German Offenlegungsschriften Nos. 2,121,670 and 2,307,589.

Cold setting foams may also be produced according to the present invention (see British Pat. No. 1,162,517 and German Offenlegungsschrift No. 2,153,086).

Foams may, of course, also be produced by the process of block foaming or by the known laminator process.

The following examples illustrate the process according to the present invention. (The figures given are to be understood as parts, by weight, or percentages, by weight, unless otherwise indicated.)

EXAMPLES

EXAMPLE 1

125 g of acrylonitrile are added dropwise to a solution of 145 g of N,N′,N″-trimethyl-diethylenetriamine in 200 ml of methanol. The reaction mixture is heated with stirring to 50° C. over a period of 3 hours.

The dinitrile thus obtained is hydrogenated in the presence of Raney-nickel to the diamine. The solvent is removed and the diamine redistilled. B.p.: 150°–157° C./0.07 mm Hg; yield: 228 g (91% of the theoretical amount).

259 g N,N″-bis(aminopropyl)-N,N′,N″-trimethyl-diethylene triamine are introduced dropwise into a mixture of 500 g of formic acid and 50 g of water. 460 ml of 30% aqueous formalin solution are then added at 100° C. The reaction mixture is heated under reflux until evolution of $CO_2$ ceases. The mixture is then cooled, adjusted to pH 2 using concentrated HCl, concentrated by evaporation and adjusted to pH 11 using concentrated NaOH.

The organic phase is separated off and distilled. 230 g (corresponding to 73% of the theoretical yield) of N,N″-bis-(dimethylaminopropyl)-N,N′,N″-trimethyl-diethylene triamine are obtained.

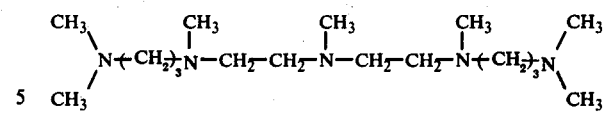

Bp: 140°–145° C. at 0.07 mm
Purity according to gas chromatographic analysis: 97%. The structure was confirmed by elemental analysis and by the infra-red, mass and nuclear resonance spectra.

EXAMPLE 2

280 g of acrylonitrile are added dropwise to a solution of 176 g of N,N′-dimethyl-ethylenediamine in 200 ml of ethanol. The reaction mixture is heated with stirring to 50° C. over a period of 3 hours.

The dinitrile thus obtained is hydrogenated in the presence of Raney-nickel to the corresponding diamine. The solvent is removed and the diamine is redistilled. B.P.: 125°–130° C./0,05 mm Hg; yield: 345 g (95 %).

192 g N,N′-bis-(dimethylaminopropyl)-N,N′-dimethylethylenediamine corresponding to the following formula:

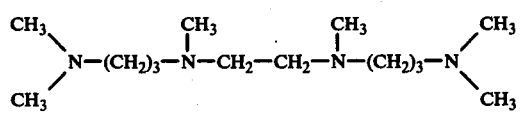

are obtained from 1 mol N,N′ -di-(aminopropyl)-N,N′-dimethylethylenediamine by a method analogous to that of Example 1.
Bp. 0.05 mm: 90°–95° C.
Purity according to gas chromatogram: 97%.
The structure was confirmed by elemental analysis and by mass, infra-red and nuclear resonance spectroscopy.

EXAMPLE 3

180 g of N-dimethylaminopropyl-N,N′,N″-tetramethyldiethylene triamine corresponding to the following formula:

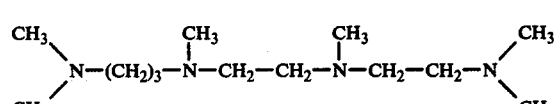

are obtained from 1 mol N-aminopropyl-N,N′,N″-trimethyldiethylene triamine by a method analogous to Example 1.
Bp: 105°–110° C. at 0.07 mm; yield: 73% of the theoretical yield.
Purity according to gas chromatograph: 96%.
The structure was confirmed by elemental analysis and by the mass, infra-red and nuclear resonance spectra.

EXAMPLE 4

179 g of hexamethyl-triethylene tetramine corresponding to the following formula:

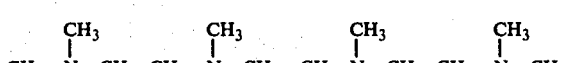

(corresponding to 76% of the theoretical yield) were obtained from 1 mol of triethylene tetramine, 460 g of formic acid and 720 ml of 30% aqueous formalin solution by a method analogous to that of Example 1.
Bp: 95°–102° C. at 0.05 mm
Purity according to gas chromatogram: 88%.
The structure was confirmed by elemental analysis and by mass, infra-red and nuclear resonance spectroscopy.

Example 5

218 g of octamethylpentaethylene hexamine corresponding to the following formula:

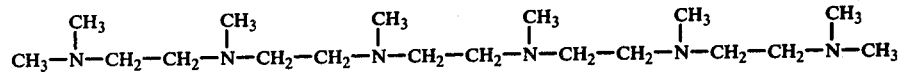

(corresponding to 62% of the theoretical yield) were obtained from 1 mol of pentaethylene hexamine, 550 g of formic acid and 960 ml of 30% aqueous formalin solution by a method analogous to that of Example 1.
Bp: 170°–180° C. at 0.1 mm
Purity according to gas chromatogram: 88%.
The structure was confirmed by elemental analysis and by infra-red and nuclear resonance spectroscopy.

EXAMPLE 6

Polyurethane foam produced using the catalyst according to Example 1: 100 parts, by weight, of a polypropylene glycol which has been started on trimethylol propane and modified with ethylene oxide to result in 80% of primary hydroxyl end groups and an OH number of 28; 3.2 parts, by weight, of water; 0.1 part, by weight, of diazabicyclo-2,2,2-octane; 1.0 part, by weight, of siloxane 1 according to British Pat. No. 1 381 571; 0.4 parts by weight of the catalyst according to Example 1; and 39.0 parts, by weight, of the polyisocyanate described below are reacted together.

The polyisocyanate was prepared as follows: 20 parts of 1,2-propylene glycol are added at 60° C. to a mixture of 225 parts of a mixture of 80% tolylene-2,4- and 20% of tolylene-2,6-diisocyanate and 274 parts of diphenylmethane-4,4-diisocyanate and the components are reacted together for 30 minutes. After the addition of 1 part of β-phenylethyl-ethyleneimine, the reaction mixture is heated to 130° C. Trimerization which takes place at this temperature is stopped by the addition of 1 part of p-toluene sulphonic acid methyl ester after 2½ hours, when the isocyanate content of the reaction mixture is 26.5%, by weight.

Dilution with an additional 624 parts of the above mixture of tolylene-2,4- and 2,6-isocyanate results in a polyisocyanate solution which has an isocyanate content of 38.4%, by weight, a viscosity at 25° C. of 24 cP and a refractive index of $n_D^{50} = 1.5738$.

A foam having the following mechanical properties is obtained:

| Gross density | DIN 53420 | (kg/m³) | 33 |
|---|---|---|---|
| Tensile test | DIN 53571 | (KPa) | 132 |
| Elongation at break | DIN 53571 | (%) | 173 |
| Compression test | DIN 53577 | (KPa) | 1.6 |

EXAMPLE 7

The following components are reacted together inside a mold: 50 parts, by weight, of polypropylene glycol which has been started on trimethylol propane and modified with ethylene oxide to result in 80% primary hydroxyl end groups with an OH number of 28; 50 parts, by weight, of a polypropylene glycol which has been started on trimethylol propane and modified with ethylene oxide to result in 70% of primary hydroxyl end groups and which has in addition been grafted with acrylonitrile and styrene in proportions of 60:40 and has an OH number of 28; 2.7 parts, by weight, of water; 0.15 parts, by weight, of diazabicyclo-2,2,2,- octane; 0.3 parts, by weight, of the catalyst from Example 2; 1.0 parts, by weight, of siloxane 1 according to British Pat. No. 1,381,571; 0.1 part by weight of a polyether polysiloxane which is marketed by Th. Goldschmidt A.G., of Essen, Federal Republic of Germany, under the trade name "Tegostab B 2909"; 27.2 parts, by weight, of a tolylene diisocyanate mixture (2,4- and 2,6-isomer in proportions, by weight, of 80:20) and 6.8 parts, by weight, of a polyphenyl-polymethylene-polyisocyanate which has been obtained by aniline-formaldehyde condensation followed by phosgenation.

A molded foam resin having the following mechanical properties is obtained:

| Gross density | DIN 53420 | (kg/m³) | 43 |
|---|---|---|---|
| Tensile test | DIN 53571 | (KPa) | 142 |
| Elongation at break | DIN 53571 | (%) | 161 |
| Compression test | DIN 53577 | (KPa) | 3.01 |

EXAMPLE 8 (Comparison of the catalytic effect of permethyl tetraethylene pentamine of the present invention and permethyl diethylene triamine of the prior art)

1. 208 g of propylene oxide/ethylene oxide copolyether started on TMP (m.w. = 6000) containing 10% by weight of a styrene/acrylonitrile graft copolymer, 2,7 g of water, 68 g of crude MDI (NCO/OH = 1:1), 1 g of a commercial silicone stabilizer and 0,2 g of the above two catalysts were intimately mixed at room temperature. The mixtures were then allowed to foam in a cylindrical mold. From an initial height of 10 cm, the reaction mixtures rose up to 72 cm (tetraethylene pentamine) and 59 cm (diethylene triamine), respectively after 100 seconds.

2. 100 g of a polypropylene glycol (m.w. 1000), 35 g of 2,4-tolylene diisocyanate and 1 g of the above catalysts were mixed intimately at 24° C. and then stirred in a flask equipped with a thermometer. The reaction mixture temperature vs. time is recorded in the following Table:

TABLE 1

| REACTION MIXTURE TEMPERATURE VS. TIME | | |
|---|---|---|
| Temperature ° C | | |
| Tramine | Pentamine | Time (secs.) |
| 25 | 27 | 30 |
| 30 | 32 | 60 |
| 32 | 36 | 90 |
| 35 | 41 | 120 |
| 40 | 45 | 150 |
| 43 | 49 | 180 |
| 44 | 50 | 210 |
| 45 | 51 | 240 |
| 46 | 51.5 | 270 |
| 47 | 52 | 300 |
| 47 | 52 | 330 |
| 47 | 52 | 360 |
| 46 | 51.5 | 390 |

TABLE 1-continued
REACTION MIXTURE TEMPERATURE VS. TIME

| Temperature °C | | |
|---|---|---|
| Tramine | Pentamine | Time (secs.) |
| 45 | 51 | 420 |

The two sets of comparison tests show that permethylated tetraethylene pentamine is a better catalyst for both foaming reaction (experiment 1) and polyurethane forming reaction (experiment 2). Both catalysts were used in exactly the same amount so that essentially the same number of tertiary nitrogen atoms was present in the comparison experiments. Unexpectedly, the nitrogen atoms in the pentamine and more effective than those in the triamine.

What is claimed is:

1. A process for the production of polyurethane resins comprising reacting:
   (a) polyisocyanates, with
   (b) higher molecular weight compounds having at least two hydrogen atoms which are reactive with isocyanates, and, optionally,
   (c) chain lengthening agents, in the presence of
   (d) tertiary amines as catalysts wherein component (d) are compounds corresponding to the following general formula:

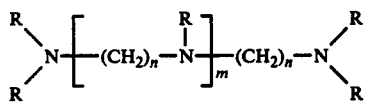

wherein the groups R, which may be the same or different, represent $C_1-C_5$ alkyl radicals; m represents an integer of from 2 to 7; and the integers n, which may be the same or different, represent 2 or 3.

2. The process of claim 1, wherein cellular polyurethane resins are produced by including in the reaction mixture a blowing agent and optionally stabilizers and other known additives.

3. The process of claim 1, wherein the R groups are methyl or ethyl groups.

4. The process of claim 1, wherein the R groups are all methyl groups.

5. The process of claim 1, wherein m represents an integer of from 2 to 4.

6. Compounds corresponding to the following general formula:

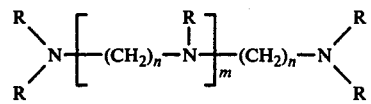

wherein the groups R, which may be the same or different, represent methyl or ethyl groups; m represents an integer of from 2 to 7; and the integers n, which may be the same or different, represent 2 or 3, but at least one of them represents 3.

7. A compound of claim 6

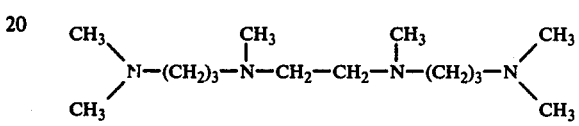

8. A compound of claim 6

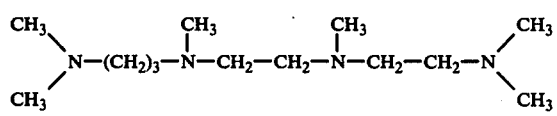

9. A compound of claim 6

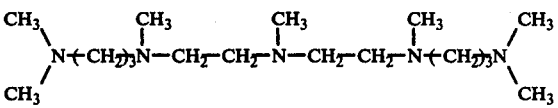

10. The compound

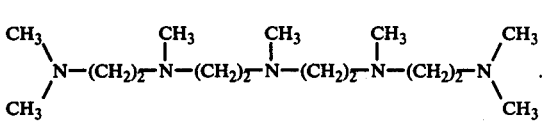

* * * * *